United States Patent
Wimmer et al.

(10) Patent No.: US 8,104,131 B2
(45) Date of Patent: Jan. 31, 2012

(54) ROLLOVER WASH UNIT FOR A VEHICLE WASH SYSTEM

(75) Inventors: Georg Wimmer, Affing (DE); Rüdiger Hirschmann, Augsburg (DE); Norbert König, Augsburg (DE)

(73) Assignee: Washtec Holding GmbH, Augsburg (DE)

( * ) Notice: Subject to any disclaimer, the term of this patent is extended or adjusted under 35 U.S.C. 154(b) by 662 days.

(21) Appl. No.: 12/160,141

(22) PCT Filed: Aug. 2, 2007

(86) PCT No.: PCT/EP2007/058013
§ 371 (c)(1),
(2), (4) Date: Sep. 2, 2008

(87) PCT Pub. No.: WO2008/031675
PCT Pub. Date: Mar. 20, 2008

(65) Prior Publication Data
US 2008/0313832 A1 Dec. 25, 2008

(30) Foreign Application Priority Data
Sep. 11, 2006 (DE) .......... 10 2006 043 221

(51) Int. Cl.
*B60S 3/06* (2006.01)
(52) U.S. Cl. .......... 15/53.3; 15/53.2; 15/DIG. 2
(58) Field of Classification Search .......... 15/53.1, 15/53.2, 53.3, DIG. 2
See application file for complete search history.

(56) References Cited

U.S. PATENT DOCUMENTS

| | | | | |
|---|---|---|---|---|
| 3,662,418 A | * | 5/1972 | Kamiya | 15/53.2 |
| 4,196,486 A | * | 4/1980 | Capra | 15/53.2 |
| 5,713,092 A | | 2/1998 | Belanger et al. | |

FOREIGN PATENT DOCUMENTS

| | | |
|---|---|---|
| AU | 1865970 | 2/1972 |
| DE | 1924322 | 7/1970 |
| DE | 2518718 | 11/1976 |
| DE | 3540598 | 5/1987 |
| JP | 60047746 | 3/1985 |

OTHER PUBLICATIONS

Intl Search Rep for PCT/EP07/058013, Mar. 20, 2008.
International Preliminary Report published Apr. 7, 2009 for PCT/EP2007/058013, filed Aug. 2, 2007.
Written Opinion of the International Search Authority published Apr. 3, 2009 for PCT/EP2007/058013, filed Aug. 2, 2007.

* cited by examiner

*Primary Examiner* — Randall Chin
(74) *Attorney, Agent, or Firm* — Martin Fleit; Paul D. Bianco; Fleit Gibbons Gutman Bongini & Bianco PL

(57) ABSTRACT

A rollover wash unit for a vehicle wash system includes interspaced lateral parts (2, 2') fitted with guides (12, 12'), and a treatment device (7) that is received in the guide elements (8, 8') via bearings (9, 9'), the guide elements being displaceable in the guides (12, 12'). In order to achieve an adaptation to the washing height, the guide elements (8, 8') are configured to enable the bearings (9, 9') to project beyond the guides (12, 12') in a final position of the guide elements (8, 8') in the guides (12, 12'), where the treatment device (7) projects upward beyond the lateral parts, (2, 2') and/or an upper edge of a traverse (5) connecting the lateral parts (2, 2'), in an uppermost position of the guide elements (8, 8').

11 Claims, 4 Drawing Sheets

ROLLOVER WASH UNIT FOR A VEHICLE WASH SYSTEM

FIELD OF THE INVENTION

The invention relates to a rollover wash unit for a vehicle wash system.

BACKGROUND OF THE INVENTION

In known rollover wash units, horizontal washing brushes, which are mounted between lateral parts and which can be driven rotatably, are typically mounted in so-called carriages. The carriages can move in vertical guide rails arranged on the insides of the lateral parts. Typically, the carriages have an elongated carriage body, which has, on both ends, rollers for guiding the carriage in the guide rails. Bearings for the horizontal washing brushes are typically provided between the rollers. In this way, a very stable mounting of the horizontal washing brushes, which rotate very quickly during the operation of the vehicle wash system, is guaranteed, because the torques generated by the rotation of the washing brushes can be received by the guide rail uniformly via the upper and the lower roller of the carriage.

However, a disadvantage in known rollover wash units is that, due to the central mounting of the washing brushes on the carriage, the length of the guide rail toward the top cannot be used fully and thus the maximum washing height is limited. For the manufacturer of vehicle wash units, this condition is accompanied by the large disadvantage that for different, desired maximum washing heights, lateral parts of different heights are needed. Therefore, in order to adapt the rollover wash unit to the washing height desired by the vehicle wash system operator, the lateral parts are often constructed in two parts with lateral frames and a moving foot, the corresponding height adaptation then being performed either by the moving foot or the lateral frames. This is complicated in terms of production, because for different maximum washing heights, moving feet or lateral parts with different heights have to be constructed and kept in inventory. In order to somewhat lessen these disadvantages, current rollover wash units are offered for defined height patterns of the maximum washing height, which are, however, not suitable for every vehicle wash system operator. This is disadvantageous primarily for vehicle wash systems arranged in washing facilities, because, especially for low-ceilinged facilities, the use of the maximum height for the washing height is desired, independently of predetermined height patterns. If there are errors in the preassembly of the rollover wash unit by the manufacturer and if these are discovered only when the rollover wash unit is installed at the vehicle wash system operators facility, the corresponding incorrect lateral parts or moving feet first must be disassembled and then replaced by parts to be delivered at a later time, which is time and cost intensive.

DE 35 40 598 C2 discloses one example of such a rollover wash unit in the form of a drying device for drying motor vehicles in vehicle wash systems, in particular, rollover wash systems. There, a gantry-like frame made from lateral parts and a traverse, a horizontal blower cabinet extending in the plane of the frame, and at least one blower connected to the cabinet are provided. A slotted nozzle with an outlet opening directed downward is arranged directly on the bottom side of the blower cabinet and the blower cabinet is mounted on the frame together with the slotted nozzle and the blower as one unit with adjustable height. The horizontal traverse of the frame is box-like and the opening of the traverse is dimensioned in such a way that the blower cabinet can be retracted completely into the traverse. In this way, the maximum wash height of the rollover wash unit is dependent on the height of the traverse mounted rigidly on the lateral parts, so that the desired wash height can be adapted only by traverses mounted at different heights. Adapting the rollover wash unit to washing facilities of different heights only by controlling the treatment device without adapting the overall height is not possible.

SUMMARY OF THE INVENTION

Therefore, the problem of the present invention is to present a rollover wash unit for a vehicle wash system, wherein this unit overcomes the disadvantages mentioned above and allows an efficient, easy-to-assemble adaptation as needed for the washing height.

This task is solved by a rollover wash unit for a vehicle wash system as claimed. Advantageous constructions and preferred improvements of the invention are specified in the subordinate claims.

The rollover wash unit mentioned above is distinguished in that the guide elements are constructed in such a way that the bearings project beyond the guides in a final position of the guide elements in the guides and the treatment device projects upward beyond the lateral parts and/or an upper edge of a traverse connecting the lateral parts in the final position of the guide elements.

In this way it becomes possible to cover different maximum washing heights by a standard roller wash unit with a standard structural height. If there are very large differences in the desired maximum washing heights to be covered, it is sufficient to provide a rollover wash unit in a first overall height for the lowest desired maximum washing height and in a second overall height for the highest desired maximum washing height, while the maximum washing heights lying in-between are covered by one of the two constructions.

In one advantageous implementation of the invention, the guide elements are constructed in the form of carriages, which have a right-angle bend pointing upward for supporting the treatment device. In this way, adaptation to the desired maximum washing height can be provided in a particularly easy manner in terms of production. This is limited only in that, in the lowest possible position of the guide element or carriage in the guide rail, the front section of the vehicle to be washed still must be able to be washed by the washing brush. In another advantageous construction of the invention, the guide elements have telescoping parts that can move vertically upward and on which the treatment device is mounted. In this way, an especially exact adaptation to the desired maximum washing height can be provided, which can also be changed to a certain extent at a later time.

In other configurations of the invention, the treatment device has a washing brush mounted horizontally and rotatably, drying nozzles, and/or nozzle arrangements. In addition, the treatment device can also contain other safety-related or spray protection-related elements.

BRIEF DESCRIPTION OF THE FIGURES

Additional details and advantages of the invention follow from the following description of a preferred embodiment with reference to the drawings, in which.

DETAILED DESCRIPTION OF THE INVENTION

The drawings show a movable rollover wash unit 1 as used in rollover vehicle wash systems. Here, the rollover wash unit 1 can be moved in the longitudinal or washing direction L relative to the stationary vehicle during the washing process. The invention, however, can also be used equally for stationary rollover wash units in drive-through wash systems, in which the vehicles are driven or are transported past one or typically several rollover wash units with different treatment devices arranged on these units.

Because the rollover wash unit 1 is constructed essentially symmetric to the line S or plane of symmetry shown in FIG. 1A, primarily the side of the rollover wash unit 1 on the left in FIG. 1B will be described below to avoid repetition, and the description of the corresponding right side will be left out, to the extent that is reasonable for explaining the invention. The corresponding statements, however, can be transferred to the right side. The corresponding right-side parts and elements will be designated with the same reference symbols as those on the left side plus an apostrophe.

Figure 2:
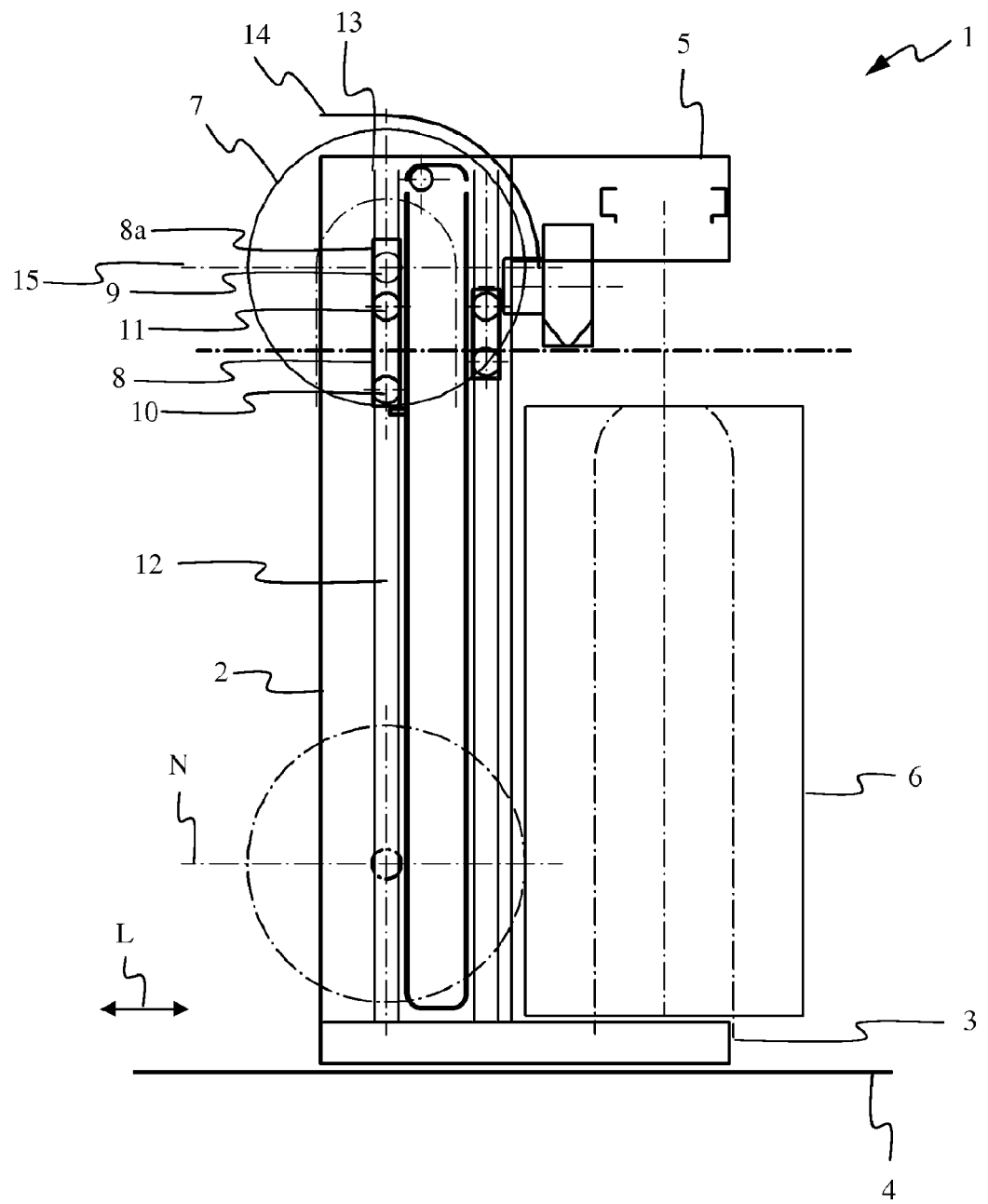
FIG. 2, is a side view of the rollover wash unit from FIG. 1 from the left, with a horizontal washing brush in a first position for a low washing height.
Figure 3:
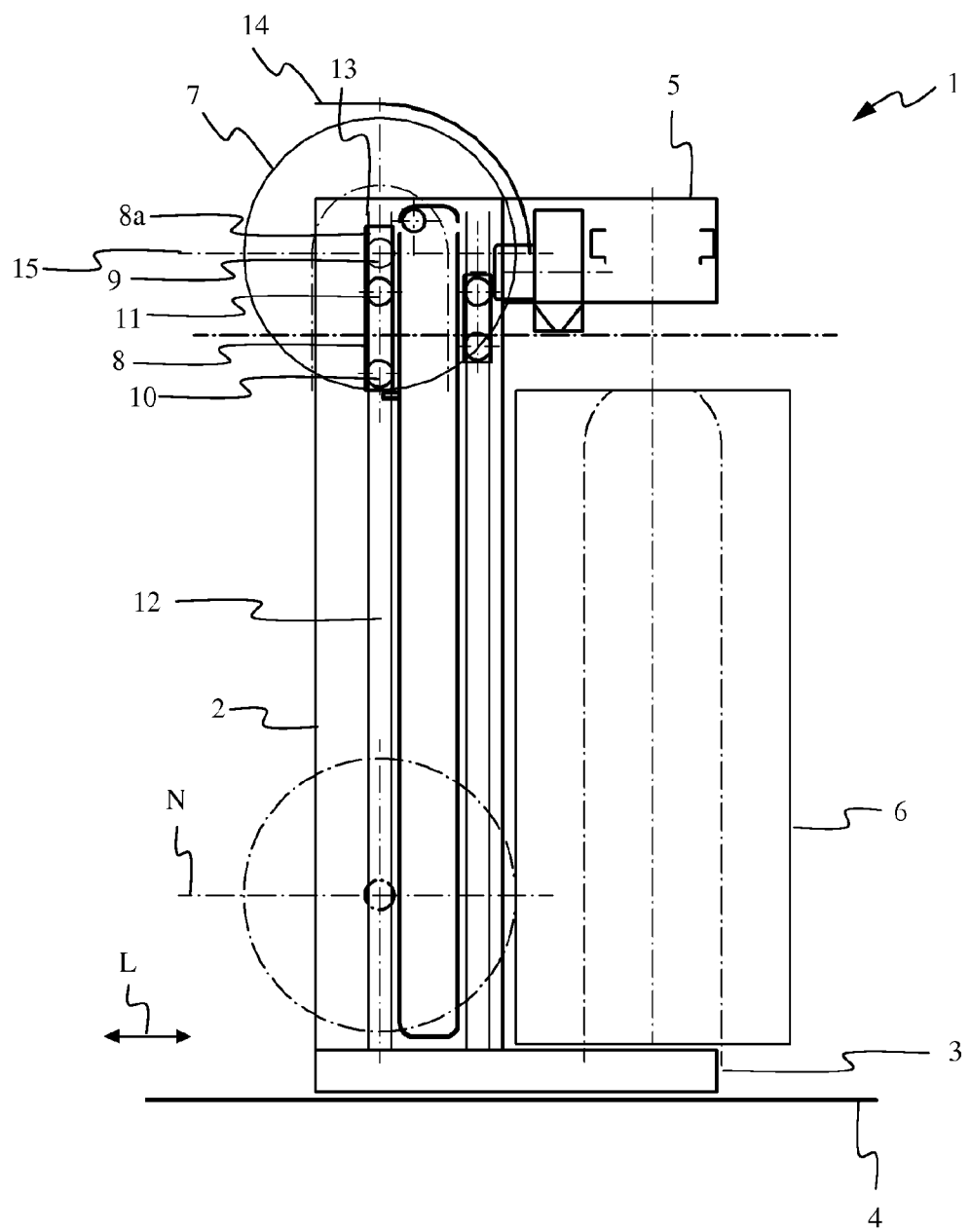
FIG. 3, is a side view of the rollover wash unit from FIG. 1 from the left, with a horizontal washing brush in a second position for a medium washing height.
Figure 4:
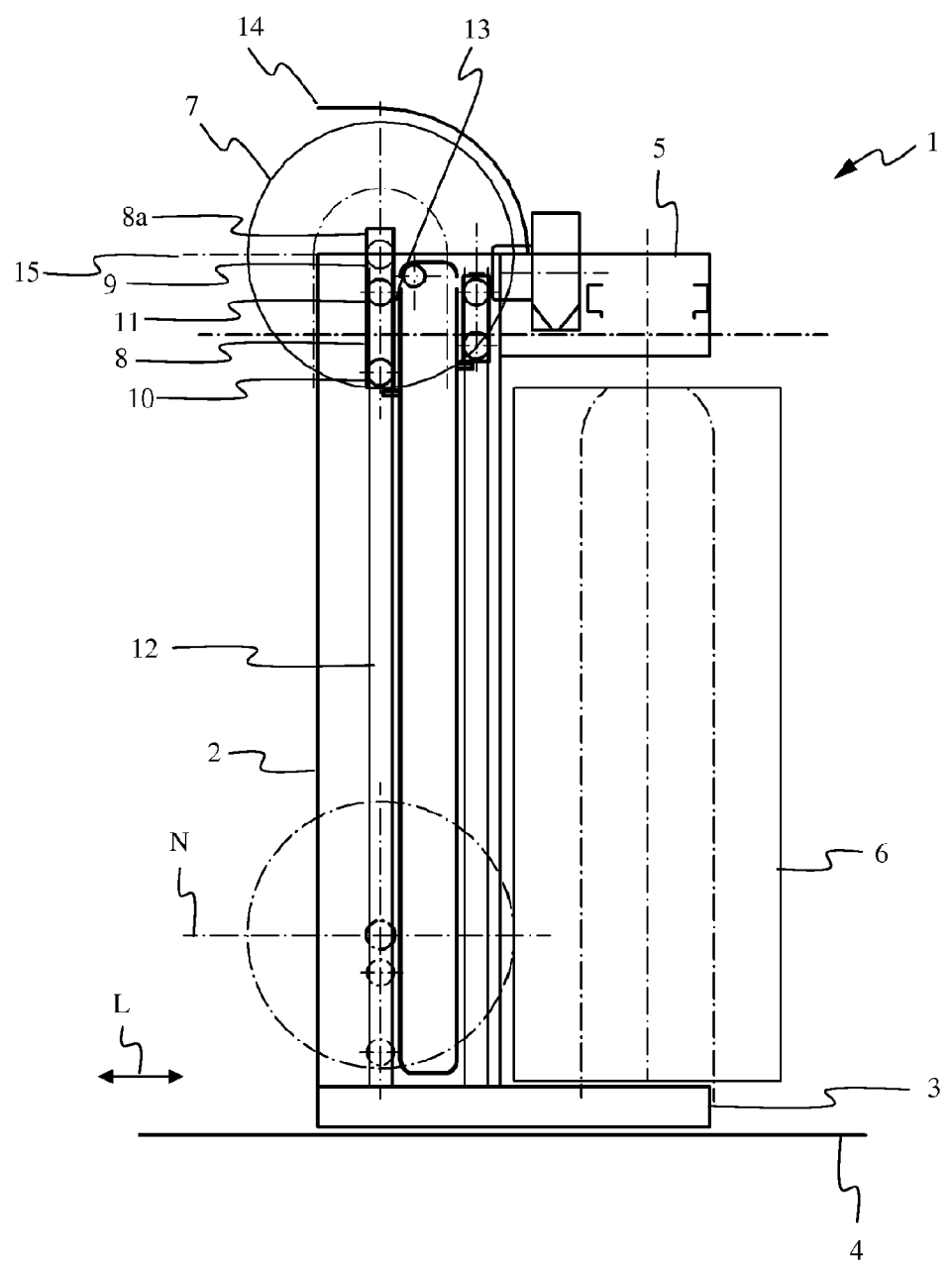
FIG. 4, is a side view of the rollover wash unit from FIG. 1 from the left, with a horizontal washing brush in a fourth position for a maximum washing height.

As is known, the rollover wash unit 1 has lateral parts 2, 2'. The lateral elements 2, 2' have moving feet 3, 3', which are mounted so that they can move by means of rollers on a rail arrangement made from two rails parallel to each other and arranged on the floor 4 of the facility. The side parts 2, 2' are connected to each other by means of a traverse 5 shown in FIGS. 2-4. Vertical washing brushes 6, which can be driven to rotate for cleaning the lateral surfaces of a vehicle to be washed and which have different heights according to the desired maximum washing height in FIGS. 2-4, are arranged between the moving feet 3, 3' and the traverse 5.

The cleaning of the essentially horizontal vehicle surfaces and also of the substantially vertical vehicle surfaces running perpendicular to the longitudinal direction L, that is, for example, the radiator grill and rear end of the vehicle, is performed by means of a horizontal washing brush 7 arranged between the lateral elements 2, 2'. The horizontal washing brush 7, which is referred to below only as washing brush 7, represents a treatment device in the sense of the invention. Instead of the washing brush 7, however, the treatment device can also be formed by a nozzle arrangement, like those used, for example, in high-pressure cleaning systems, or by a drying device.

The washing brush 7 is mounted so that it can rotate about a rotational axis D by means of bearings 9, 9' on a carriage 8, 8'. The washing brush 7 is driven by a drive, here an electric motor 16, arranged between the carriage 8 and the washing brush 7. Instead of an electric motor, however, alternative drives can also be used, for example, belt drives or hydraulic drives.

Figure 1:
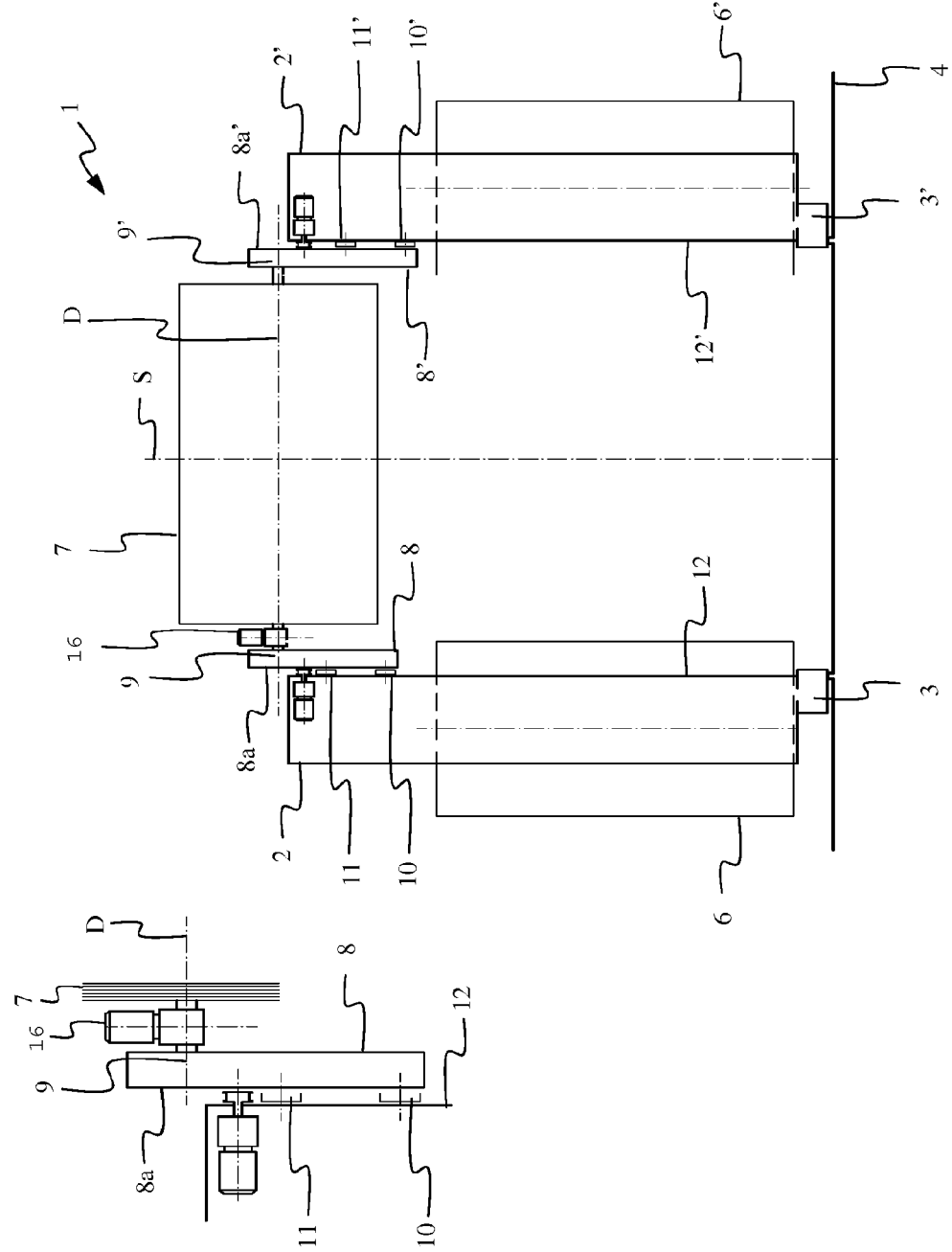
FIG. 1A and FIG. 1B, are schematic front views and a detail of a rollover wash unit according to the invention.

The bearing 9 is here arranged in an upper end 8a of the carriage 8 in FIGS. 1A and 1B. At its lower end and in its middle, the carriage 8 further has rollers 10, 11, which engage in a guide rail 12 arranged on the lateral part 2. The guide rail 12 ends at an upper end 13, up to which the upper roller 11 of the carriage 8 can be moved. This final position of the carriage 8 in the guide rail 12 is shown in FIG. 4. As is also evident from FIG. 4, the upper end 8a of the carriage 8 with the bearing 9 of the washing brush 7 projects beyond the upper end 13 of the guide rail 12, wherein the washing brush 7 projects far beyond the upper edge of the traverse 5. The washing height shown in FIG. 4 represents the maximum possible washing height for this structural height in the rollover wash unit 1 shown in the drawings. If the installation location of the vehicle wash system has a lower ceiling that that in FIG. 4 and therefore a lower maximum washing height is desired, as shown in FIG. 2, then the rollover wash unit 1 with the same overall height from FIG. 4 can nevertheless still be used, without having to perform special structural changes to the rollover wash unit 1.

In order to protect the washing brush 7 from contact with the ceiling of the washing facility and to prevent spraying of washing water by the washing brush 7 onto the ceiling of the washing facility and beyond the rollover wash unit 1, a protective cover 14 is provided on the rollover wash unit 1.

In each of FIGS. 2-4, the washing brush 7 is shown with solid lines in an upper position. The washing brush 7 shown with dash-dot lines indicates the lowest position N of the washing brush 7, in which the washing brush 7 can still clean the lowest areas of the vertical front and rear-end surfaces of a vehicle to be washed. The lowest position N is equal for the use of a carriage size for all structural heights. In contrast, the dash-dot line 15 characterizes the height of the rotational axis D of the washing brush 7, which can also be used as a measure for the desired maximum washing height across the diameter of the washing brush 7.

FIGS. 2-4 show how different maximum washing heights can be implemented by means of a rollover wash unit 1, for a given desired structural height. In each case, the carriage 8 can move into the lowest position N, in order to be able to wash the vertical surfaces and surfaces running transverse to the longitudinal direction on a vehicle to be washed.

The rotational axis D of the washing brush still runs in the area of the guide rails 12 in the positions shown in FIGS. 2 and 3 for low and medium desired maximum washing heights.

If a higher maximum washing height is desired, however, then the carriage 8 can be moved even farther upward, the rotational axis D then projecting beyond the upper end 13 of the guide rail 12. In FIG. 4, the carriage 8 is shown in its upper final position in the guide rail 12 and the bearings 9 then project to a maximum extent beyond the guide rail 12. This final position then limits the maximum washing height for the rollover wash unit 1 of this structural height.

In the prior art, a conventional attachment of the washing brush 7 on the carriage 8 would be by means of bearings 9, 9' being arranged between the rollers 10, 11 and, therefore, the rotational axis D would be located in the position of the carriage 8 shown in FIG. 4, Such an attachment, according to the prior art, would only allow the washing brush 7 to be raised to a washing height that lies between those shown in FIGS. 2 and 3.

The rollover wash unit 1 according to the invention makes it possible to accommodate different desired maximum washing heights with a single overall height of the rollover wash unit 1. Therefore, for mounting the rollover wash unit 1 on site, only the corresponding vertical washing brushes 6 need be arranged at a suitable height. Adaptation of the desired maximum washing height by means of different moving feet 3 or lateral parts 2 is not necessary. Adaptation to very different maximum washing heights can also be realized by using carriages 8, 8' of different lengths.

In an embodiment of the invention that is not shown here, the projections of the carriages 8, 8' are implemented by right-angle bends. The carriages are then shorter, the upper rollers then being arranged on the upper end 8*a*, 8*a'* of the carriages. The right-angle bend elements are arranged with one end between the rollers, while, in the final position of the carriage in the guide rails forming the guides, their other end projects beyond these rollers.

The invention claimed is:

1. A rollover wash unit for a vehicle wash system, comprising:
    at least two lateral parts spaced apart from each other and which include lateral guides;
    a guide carriage movably mounted to each of said lateral guides;
    bearings;
    a treatment device mounted by means of said bearings on said guide carriages movable in the guides, the guide carriages constructed to enable the bearings to project beyond the guides whereby the treatment device is projectable upward beyond the lateral parts.

2. The rollover wash unit according to claim 1, wherein the guide carriages are movable in a vertical direction in said lateral guides.

3. The rollover wash unit according to claim 1, wherein the guide carriages are constructed with projections pointing vertically upward for supporting the treatment device.

4. The rollover wash unit according to claim 1, wherein the treatment device includes a drying device.

5. The rollover wash unit according to claim 1, wherein the treatment device includes a nozzle arrangement.

6. The rollover wash unit according to claim 1, wherein the treatment device includes a washing brush mounted horizontally between said lateral parts and rotatably mounted by said bearings.

7. The rollover wash unit according to claim 6, wherein a separate drive is attached to the washing brush.

8. The rollover wash unit of claim 1, further including a traverse member connecting an upper portion of said at least two lateral parts, said treatment device operative to extend above said traverse member when said bearings project beyond the guides.

9. A device for a vehicle wash system including a treatment device, comprising:
    two lateral parts each having a base and an uppermost extent, said lateral parts mountable to enable a vehicle to pass therebetween, each lateral part including at least one guide rail;
    two carriages each movably mounted to said at least one guide rail, each carriage configured to move between a location proximate said base of one of said lateral parts, and a location which extends above said uppermost extent of one of said lateral parts; and
    at least two bearings, each configured to connect the treatment device to said carriages.

10. The device of claim 9, wherein each of said carriages is movably mounted to said at least one guide rail along two paths of movement.

11. The device of claim 9, wherein each of said carriages is guided within said at least one guide rail of a lateral part to be movable along guide paths defining two vertically extending parallel axes.

* * * * *